US009565439B2

(12) United States Patent
Bush et al.

(10) Patent No.: US 9,565,439 B2
(45) Date of Patent: Feb. 7, 2017

(54) SYSTEM AND METHOD FOR ENHANCING DATA COMPRESSION USING DYNAMIC LEARNING AND CONTROL

(75) Inventors: Stephen Francis Bush, Latham, NY (US); John Erik Hershey, Ballston Lake, NY (US); Michael J Dell'Anno, Clifton Park, NY (US)

(73) Assignee: NBCUniversal Media, LLC, Wilmington, DE (US)

( * ) Notice: Subject to any disclaimer, the term of this patent is extended or adjusted under 35 U.S.C. 154(b) by 2062 days.

(21) Appl. No.: 12/579,474

(22) Filed: Oct. 15, 2009

(65) Prior Publication Data
US 2011/0090950 A1 Apr. 21, 2011

(51) Int. Cl.
| | | |
|---|---|---|
| H04N 7/26 | (2006.01) | |
| H04N 19/12 | (2014.01) | |
| H04N 19/196 | (2014.01) | |
| H04N 19/15 | (2014.01) | |
| H04N 19/152 | (2014.01) | |
| H04N 19/154 | (2014.01) | |
| H04N 19/436 | (2014.01) | |

(52) U.S. Cl.
CPC ............ *H04N 19/12* (2014.11); *H04N 19/15* (2014.11); *H04N 19/152* (2014.11); *H04N 19/154* (2014.11); *H04N 19/196* (2014.11); *H04N 19/436* (2014.11)

(58) Field of Classification Search
CPC ... H04N 5/4401; H04N 19/00472; H04N 7/26
USPC ........................................ 375/240.01, 240.02
See application file for complete search history.

(56) References Cited

U.S. PATENT DOCUMENTS

| | | | |
|---|---|---|---|
| 6,101,278 A | * | 8/2000 | Chen et al. ................... 382/239 |
| 6,252,905 B1 | | 6/2001 | Pokrinchak et al. |
| 7,180,943 B1 | | 2/2007 | Arlid et al. |
| 7,302,102 B2 | | 11/2007 | Reynolds et al. |
| 7,352,808 B2 | | 4/2008 | Ratakonda et al. |
| 2002/0059643 A1 | * | 5/2002 | Kitamura et al. ............ 725/136 |

(Continued)

OTHER PUBLICATIONS

Diab Z and Cohen P; "Motion compensated video compression using adaptive transformations"; Publication Date: Apr. 21-24, 1997; vol. 4, vol. 4; Meeting Date: Apr. 21-24, 1997; Location: Munich, Germany; ISBN: 0-8186-7919-0; References Cited: 13; INSPEC Accession No. 5744693; Digital Object Identifier: 10.1109/ICASSP.1997.595391; Current Version Published: Aug. 6, 2002. Abstract is 1 Page.

*Primary Examiner* — Yulin Sun
(74) *Attorney, Agent, or Firm* — Fletcher Yoder, P.C.

(57) ABSTRACT

A data compression system and method for achieving enhanced compression performance in a plurality of encoder-decoder pairs communicatively coupled in a concatenated chain is disclosed. The plurality of encoder-decoder pairs receive input data and transform the input data into compressed output data. The data compression system includes at least one quality estimator communicatively coupled to the concatenated chain to determine a plurality of quality metrics corresponding to an output from each of the plurality of encoder-decoder pairs. Further, the data compression system also includes a processing subsystem configured to optimize the operation of each of the plurality of encoder-decoder pairs based upon the plurality of quality metrics to achieve a desired level of optimization for the concatenated chain.

20 Claims, 3 Drawing Sheets

(56) References Cited

U.S. PATENT DOCUMENTS

2006/0251330 A1 11/2006 Toth et al.
2010/0220906 A1* 9/2010 Abramoff et al. ............ 382/130

* cited by examiner

SYSTEM AND METHOD FOR ENHANCING DATA COMPRESSION USING DYNAMIC LEARNING AND CONTROL

BACKGROUND

Embodiments of the present technique relate generally to data compression devices, and more particularly to video compression devices employing dynamic learning and control.

Digital broadcast networks that transport and deliver image sequences in near real-time, such as movies and live interviews, face a series of challenges. The first of these challenges is the digitization and transmission of enormously large digital streams of symbols over a limited bandwidth. A present day high definition television camera, for example, produces a digital stream of over two hundred million bytes per second. Data transport network costs for accommodating such high data rates are prohibitive, even if the requisite channels are available. The next challenge, therefore, faced by the transport network, is to compress these extremely high data rates into lower data rate streams for transmission over the available channels.

Further, transcontinental and intercontinental broadcast of video content, such as a sports event, requires several intermediate communication links coupled to one another for ensuring complete end-to-end delivery. This coupling is referred to as a "concatenation" and is an area of significant attention for maintaining video and audio quality and integrity. Concatenation involves multiple encode-decode processes associated with digital turn-around over satellite, wireless, and terrestrial links. Further, concatenations result in accumulation of distortions introduced during the multiple encode-decode processes, thereby reducing video quality at successive delivery feeds. Considerable efforts have been made to develop efficient data compression algorithms and standards suitable for video compression such as MPEG-2, MPEG-4, and H.264. Each of these techniques employs different parameter settings, such as a desired sample depth, a macroblock size, and a chroma format for encoding and decoding data. The compression, however, is usually lossy, and includes visible, and often, distracting artifacts in the decompressed image sequence displayed to a human user. This loss of fidelity is a result of different encoders and decoders performing rate control optimizations independent of the other elements of the concatenation. An MPEG-2 encoder, for example, employs a relatively larger macroblock for encoding, and therefore, may introduce artifacts in an image sequence traversing a concatenated chain of compressive devices. As a result, an H.264 encoder positioned further down the concatenated chain and employing a much smaller macroblock, incurs wasted computation and bandwidth to reproduce, with high fidelity, the artifacts and errors introduced by the MPEG-2 encoder.

Further, as the number of encoders and decoders in the concatenation grows, the large number of video compression parameters and the types of scenes to be analyzed result in a combinatorial explosion in the growth of the search space for determining optimal encoder and decoder parameter settings. A technique that improves this search in near real-time and optimizes performance along an entire chain of encoding and decoding devices would be of significant benefit in terms of reducing the cost of video transport while maintaining video quality.

It may therefore be desirable to develop an adaptive data compression system optimized for repeated encoding and decoding of different types of data sequences along a concatenated chain of compressive devices. Additionally, there is a need for a system configured to allow a large number of channels to be carried within a limited bandwidth with acceptable video quality.

BRIEF DESCRIPTION

In accordance with aspects of the present technique, a data compression system including a plurality of encoder-decoder pairs communicatively coupled in a concatenated chain is described. The plurality of encoder-decoder pairs are configured to receive input data and transform the input data into compressed output data. The data compression system also includes at least one quality estimator communicatively coupled to the concatenated chain to determine a plurality of quality metrics corresponding to an output from each of the plurality of encoder-decoder pairs. Further, the data compression system includes a processing subsystem configured to optimize operation of each of the plurality of encoder-decoder pairs based upon the plurality of quality metrics to achieve a desired level of optimization for the concatenated chain.

In accordance with another aspect of the present technique, a method for improving data compression in a plurality of encoder-decoder pairs communicatively coupled in a concatenated chain is presented. The method includes: identifying one or more desired characteristics of input data provided to the plurality of encoder-decoder pairs that are configured to receive the input data and transform the input data into compressed output data. The method further includes estimating a plurality of quality metrics corresponding to an output from each of the plurality of encoder-decoder pairs. Subsequently, the method optimizes the operation of each of the plurality of encoder-decoder pairs based upon the plurality of quality metrics, to achieve a desired level of optimization for the concatenated chain.

DRAWINGS

These and other features, aspects, and advantages of the present technique will become better understood when the following detailed description is read with reference to the accompanying drawings in which like characters represent like parts throughout the drawings, wherein.

DETAILED DESCRIPTION

In the following sections, a system and a method for enhancing data compression in a concatenated chain of encoder-decoder pairs are presented. Embodiments illustrated hereinafter describe a data compression system and a method for enhancing data compression capable of 'learning' to optimize compression performance of the overall concatenated chain over a period of time. Particularly, the system is configured to iteratively vary one or more parameters corresponding to an encoder-decoder pair until output data having either or both of a desired quality and compression rate is obtained from the corresponding encoder-decoder pair. The system is further configured to learn to optimize operation of the concatenated chain by optimizing each of encoder-decoder pairs based on the evaluation of quality metrics determined for each of the encoder-decoder pairs. The system, thus, unifies data rate control, thereby allowing better resource allocation for achieving a desired level of optimization throughout the concatenated chain.

Although the present technique is described with reference to video compression, the technique may be used in many different operating environments and systems for compressing image data, audio data, or a combination of audio and image data. An exemplary environment that is suitable for practicing various implementations of the present technique is discussed in the following sections with reference to FIGS. 1-3.

Figure 1:
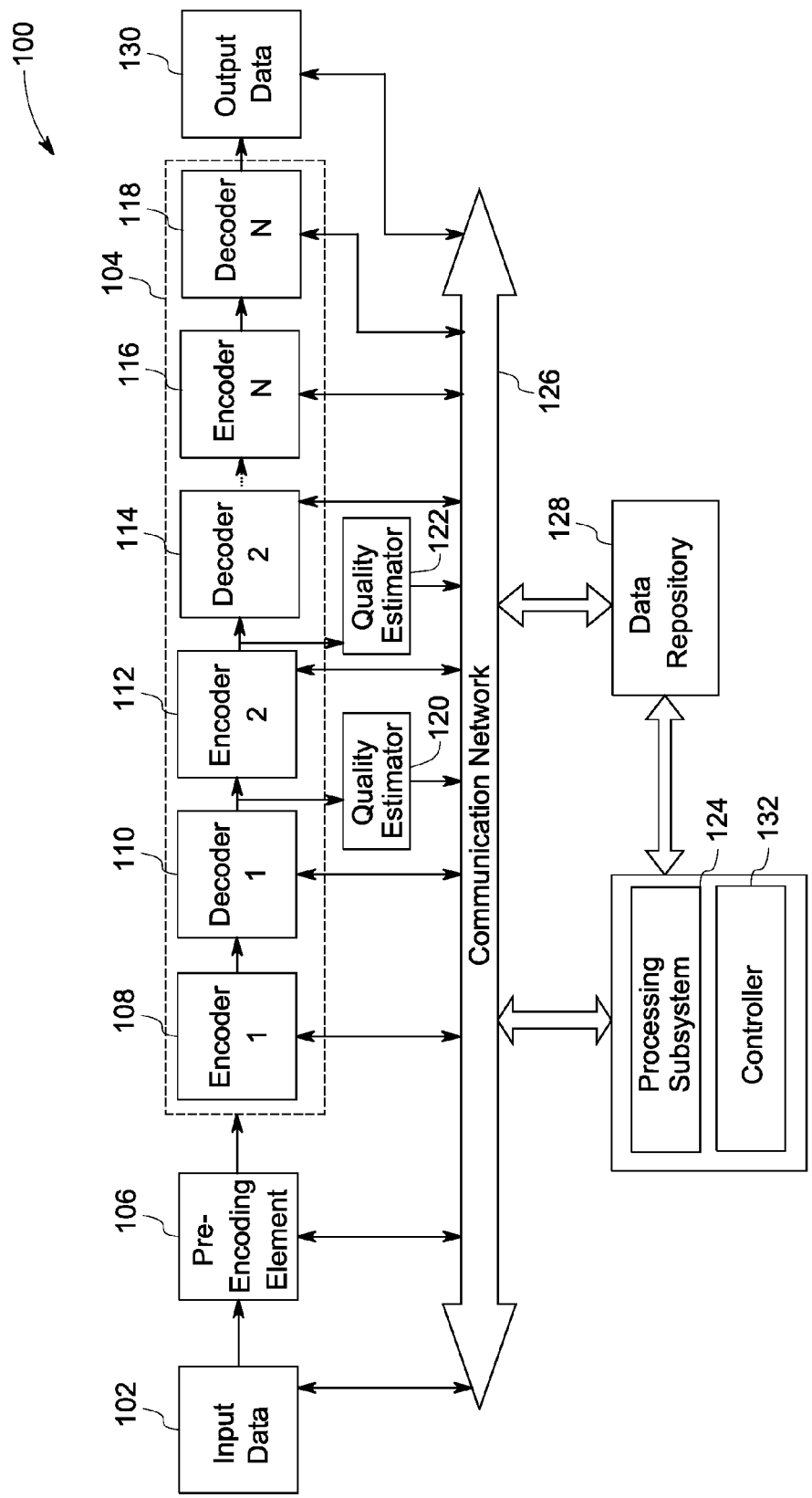
FIG. 1 is a block diagram of a data compression system including dynamic learning and control, in accordance with aspects of the present technique.

FIG. 1 illustrates an exemplary data compression system 100 capable of learning to optimize compression of input data 102 provided to a plurality of encoder-decoder pairs communicatively coupled in a concatenated chain 104. The concatenated chain 104 may be representative of a geographically large digital network including several local transmission centers. The encoder-decoder pairs in the concatenated chain 104 may adhere to one or more compression standards such as MPEG-2, MPEG-4, H.264, or WMV9, and therefore may employ different parameter settings.

In accordance with aspects of the present technique, the system 100 includes a pre-encoding element 106 in operative association with the concatenated chain 104 for analyzing the input data 102. In the illustrated embodiment, the concatenated chain 104 includes a first encoder 108 and a first decoder 110 forming a first encoder-decoder pair. Similarly, the data compression system 100 includes a second encoder 112 and a second decoder 114 forming a second encoder-decoder pair and so on until Nth encoder 116 and Nth decoder 118 form the Nth encoder-decoder pair. Although FIG. 1 depicts only six compressive devices, fewer or more such devices may be coupled in the concatenated chain 104 based on application or network requirements. The data compression system 100 may further include at least one quality estimator to determine a plurality of quality metrics corresponding to an output from each of the plurality of encoder-decoder pairs. In the contemplated configuration, the data compression system 100 includes a first quality estimator 120, and a second quality estimator 122 for estimating quality of video output at one or more points along the concatenated chain 104. Each quality estimator may be communicatively coupled to a corresponding encoder-decoder pair to generate a quality metric representative of the corresponding compression performance. Additionally, the data compression system 100 may also include a processing subsystem 124 for processing the input data 102. The processing subsystem 124 may be communicatively coupled to the quality estimators 120 and 122, and the concatenated chain 104 over a communication network 126. The communication network 126 may include either or both of wired networks such as LAN and cable, and wireless networks such as WLAN, cellular networks, and satellite networks. Further, the communication network 126 facilitates transmission of the input data 102 to the pre-encoding element 106 prior to being input to the concatenated chain 104.

The pre-encoding element 106 may analyze the input data 102 for determining one or more desired characteristics of the input data 102. The desired characteristics may include one or more localized interest points, an object size, a location, a velocity vector, and so on. Further, the pre-encoding element 106 may employ techniques such as Kalman filtering for detecting the desired characteristics. In some embodiments, the pre-encoding element 106 may be configured to detect the desired characteristics based on requirements of a particular application or a particular user. Additionally, in a video compression application, the pre-encoding element 106 may be further configured to divide an input image sequence into one or more segments for evaluating the consistency of the desired characteristics across the different segments. To that end, the pre-encoding element 106 may include a probe, a data acquisition unit, or an image processor (not shown in FIG. 1) for processing each segment individually to detect the desired characteristics.

Segmentation of the input image sequence facilitates efficient detection of relevant regions of interest in the image sequence that need to be accurately transmitted. Identification of relevant regions of interest allows the data compression system 100 to distinguish between regions that need to be encoded by employing more bits in comparison to the other regions of the image sequence. In a videoconferencing application, for example, faces of speakers or documents may be of particular interest. The regions of interest including facial features therefore need to be encoded and decoded with parameter settings that yield better quality images. In order to detect particular regions of interest, the pre-encoding element 106 may be further configured to perform downsampling to reduce raw data rate of the input data 102 before being input into the concatenated chain 104. In alternative embodiments, however, detection of the desired characteristics of the input data 102 may be performed before the input data 102 is input to the concatenated chain 104, after decoding or in a compressed state.

In one embodiment, the desired characteristics may relate to a determined motion complexity of the input image sequence. Image sequences including different motion complexities typically entail different encoding parameters for achieving optimal output video quality. For example, the encoder and decoder parameter settings corresponding to optimal encoding of black and white images including moving sharp edges may be different from the parameter settings employed for multi-colored and soft contoured images. Detection of such characteristics, therefore, simplifies the amount of information to be processed while determining optimal parameter settings that enable the concatenated chain 104 to deliver desired output data quality and compression rates. Further, in certain embodiments, the processing subsystem 124 may be configured to perform one or more functions of the pre-encoding element 106. In such embodiments, the pre-encoding element 106 may not be required as the processing subsystem 124 may be adapted to process the input data 102 for detecting the one or more desired characteristics that affect compression performance.

At the outset of a compression process, the first encoder 108 compresses and encodes the input data 102. Encoded output from the first encoder 108 is transmitted to the first decoder 110, which decodes the encoded output. Additionally, the first decoder 110 may be further configured to deliver decoded output to a first feed (not shown in FIG. 1) for local broadcast. The first decoder 110 may further communicate the decoded output to the quality estimator 120. The quality estimator 120 determines the quality of output video produced by the first encoder-decoder pair 108 and 110. Particularly, the first quality estimator 120 may process the decoded output to estimate quality metrics such as a just noticeable difference (JND), a peak signal-to-noise ratio (PSNR), a structural similarity (SSIM), a compression rate, an image quality, an audio quality, or combinations thereof. Typically, the first quality estimator 120 employs reference image sequences stored in a data repository 128 coupled to the one or more of the quality estimators 120 and 122 to compare input and output video. Alternatively, the quality estimators 120 and 122 may employ deductive or estimation functions for estimating the quality metrics based on values measured from the decoded output.

Subsequently, the decoded output from the first decoder 110 is directed to the second encoder 112 that re-encodes the decoded output. Typically, the first and second encoder-decoder pairs may adhere to different compression protocols. The second encoder 112, therefore, may employ different parameter settings than those employed by the first encoder 108 to re-encode the decoded output. The re-encoded output is transmitted to the second decoder 114, which decodes the re-encoded output. The second decoder 114 may be further configured to deliver the decoded output to a second feed (not shown in FIG. 1) for local broadcast, and optionally to other communication networks, which may include further concatenations of compressive devices. Moreover, the second quality estimator 122 may also receive the decoded output from the second decoder 114 for estimation of the quality metrics of the decoded output delivered to the second feed. Although the illustrated embodiment includes two quality estimators 120 and 122, fewer or more quality estimators may be employed. Alternative embodiments may employ the processing subsystem 124 to perform the functions in lieu of the quality estimators 120 and 122. To that end, the processing subsystem 124 may be configured to determine a plurality of quality metrics corresponding to an output from each of the plurality of encoder-decoder pairs.

Further, the processing subsystem 124 is configured to iteratively vary one or more parameters corresponding to an encoder-decoder pair until output data 130, having either or both of a desired quality and compression rate, is obtained. Particularly, the processing subsystem 124 is configured to analyze the effect of variations in the parameters on the quality metrics corresponding to an output from each encoder-decoder pair. In one embodiment, the data repository 128 stores the data required by the processing subsystem 124 for such an analysis. The stored data may include the input data 102, the plurality of quality metrics corresponding to an output from each of the plurality of encoder-decoder pairs, and optimal values determined for the one or more parameters corresponding to the plurality of encoder-decoder pairs.

The processing subsystem 124 may be further configured to analyze a specific arrangement and compressive capabilities of the encoder-decoder pairs in the concatenated chain 104 while determining the optimal values. Typically, MPEG-2 encoder-decoder pairs generate an image quality that is substantially lower than that generated by H.264 encoder-decoder pairs. Therefore, if the concatenated chain 104 includes an MPEG-2 encoder-decoder pair prior to an H.264 encoder-decoder pair, the processing subsystem 124 may be configured to focus more on optimizing data compression in the H.264 encoder-decoder pair and less on reproducing an already potentially lower quality image generated by the MPEG-2 encoder-decoder pair. Alternatively, if the concatenated chain 104 includes an H.264 encoder-decoder pair prior to an MPEG-2 encoder-decoder pair, then the processing subsystem may optimize operation of the MPEG-2 encoder-decoder pair to capture and maintain the higher quality input from the H.264 encoder-decoder pair.

Such a behavior of the processing subsystem 124 is on account of the fact that the H.264 standard allows for a variety of entropy encoding schemes compared to a fixed scheme employed by the MPEG-2 standard. In particular, the new Context-based Adaptive Binary Arithmetic Coding (CABAC) scheme of the H.264 standard improves compression efficiency by 5-20%. Moreover, the H.264 standard permits simultaneous mixing of different block sizes (down to 4×4 pixels), thereby allowing the codec to accurately define fine detail by employing smaller blocks as opposed to a fixed block size employed by MPEG-2 devices. The optimization process followed by the processing subsystem 124, thus, considers constitution of the concatenated chain 104 to determine optimal values of parameters corresponding to each encoder-decoder pair. The processing subsystem 124 is therefore able to provide a more fine-tuned level of optimization for the entire concatenated chain 104.

Further, the data compression system 100 may include a controller 132 configured to update one or more parameters corresponding to the encoder-decoder pairs with the corresponding optimal values. Alternatively, the processing subsystem 124 may include integrated circuitry for updating the parameters corresponding to the encoder-decoder pairs at determined time intervals or substantially in real-time minus typical processing and transmission delays.

Although FIG. 1 illustrates a single processing subsystem 124 operating centrally, the data compression system 100 may include additional processing subsystems operatively coupled to encoder-decoder pairs in the concatenated chain 104. Thus, in certain embodiments, the processing subsystem 124 may operate in a distributed manner with optimal values determined for different parts of the concatenated chain 104 and reported to the central processing subsystem 124 for consolidation. The ability of the processing subsystem 124 to optimize operation of each of the encoder-decoder pairs based on the quality metrics aids in achieving a desired level of optimization for the entire concatenated chain 104. Further, the processing subsystem 124 adaptively optimizes compression based on the arrangement of compressive devices in the concatenated chain 104. The adaptive optimization enables the processing subsystem 124 to ascertain appropriate scenarios that require computational effort to optimize compression rate rather than output data quality, and vice versa. Moreover, the adaptive optimization prevents the processing subsystem 124 from choosing an improper quality or compression tradeoff in a segment of the concatenated chain 104 that may lead to wasted bandwidth in a later segment if the optimization is performed independently as in the case of conventional compression systems. Additionally, the processing subsystem 124 may be configured to update only commercially accessible hardware and software parameters corresponding to the encoder-decoder pairs, thus requiring no special hardware or software interfaces.

Figure 2:
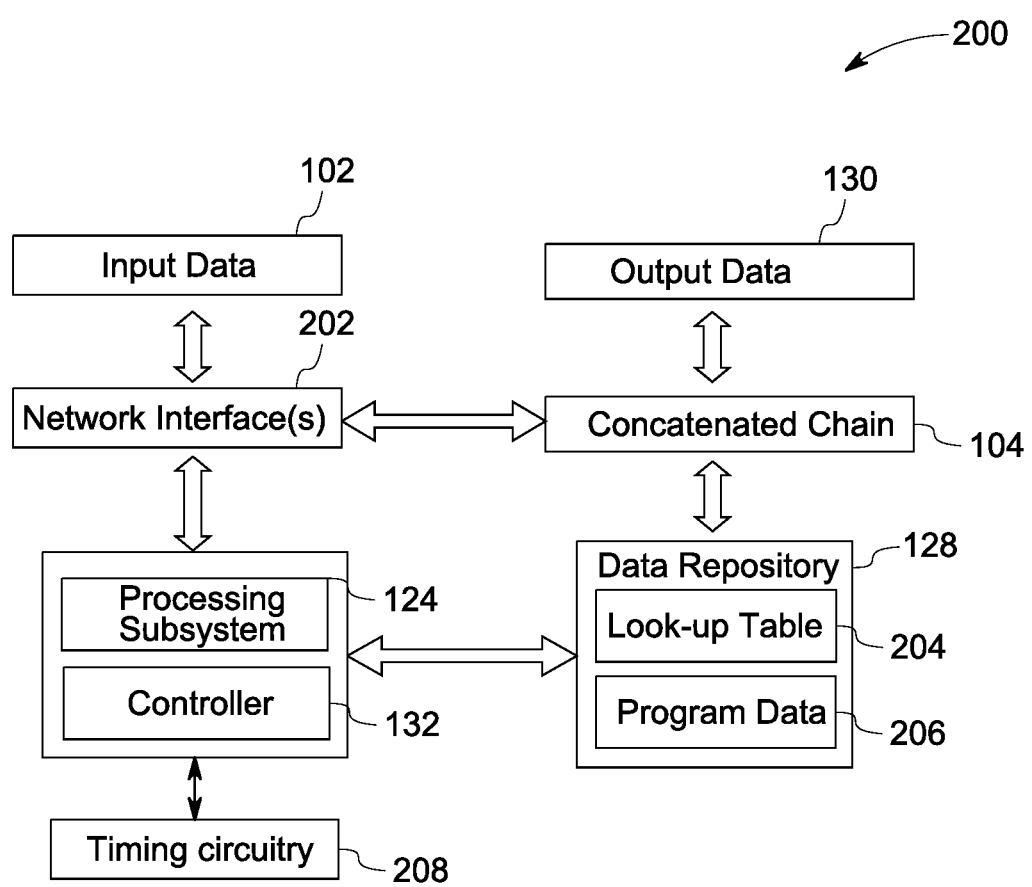
FIG. 2 is a block diagram of an exemplary operating environment for a video compression system configured to improve video compression in a concatenated chain, in accordance with aspects of the present technique.

Further, FIG. 2 illustrates an exemplary operating environment 200 for the processing subsystem 124 (see FIG. 1) for improving video compression in a concatenated chain of compressive devices, such as the concatenated chain 104 of FIG. 1. In the following sections, the terms "compressive devices", "encoders and decoders", and "encoder-decoder pairs" are used interchangeably. For clarity, various implementations of the processing subsystem 124 are described with reference to the elements of FIG. 1. In one embodiment, the processing subsystem 124 is coupled to the concatenated chain 104 and the data repository 128 (see FIG. 1) through one or more network interfaces 202. The network interfaces 202 enable the processing subsystem 124 to connect to a wide variety of networks and protocol types such as the communication network 126 of FIG. 1. Further, the processing subsystem 124 may be coupled to other devices (not shown in FIG. 2) such as image acquisition units and image processing systems for acquiring image data related to the input data 102 (see FIG. 1) in a video compression application.

In accordance with aspects of the present technique, the processing subsystem 124 may include one or more microprocessors, microcomputers, microcontrollers, dual core processors, and so forth. In one embodiment, the processing subsystem 124 may be configured to iteratively learn to optimize parameter settings corresponding to an encoder-decoder pair by analyzing a plurality of quality metrics corresponding to an output generated by that encoder-decoder pair. For accomplishing iterative learning, the processing subsystem 124 may be implemented as a simple linear classifier configured to learn to optimize overall compression performance in the concatenated chain 104 over a determined period of time. The linear classifier may include a perceptron, a decision tree, a neural network, a support vector machine, or combinations thereof. Structural linearity of the linear classifier may enable the processing subsystem 124 to determine optimal parameter values for the encoder-decoder pairs that efficiently control data rates generated by the data compression system 100. Additionally, the processing subsystem 124 may further include the controller 132 for updating the parameters corresponding to the encoder-decoder pairs with the determined optimal values that achieve a desired level of optimization for the entire concatenated chain 104.

The optimal values may be based on a plurality of factors determined by particular requirements of an application, a device, a user, or combinations thereof. Some applications, such as medical imaging require a reconstructed image to be substantially similar to a corresponding original image. Other applications, however, such as a television broadcast, may allow a determined loss in quality in an image in favor of a better compression rate. The processing subsystem 124, therefore may be configured to determine the optimal values of the parameter settings that employ higher bit rates for encoding medical images. Conversely, for a television broadcast, the processing subsystem 124 may be configured to determine the parameter settings that achieve a good compression ratio. Additionally, the processing subsystem 124 may be further configured to analyze application mandated or user mandated requirements while determining optimal values for the parameter settings. The application mandated or user mandated requirements may include a determined output data rate, a determined compression ratio, a peak-signal-to-noise-ratio (PSNR), or combinations thereof. Thus, the number of factors to be analyzed by the processing subsystem 124 while determining optimal values for the parameter settings is very large and results in a combinatorial explosion. The large number of factors especially becomes prohibitive while determining optimal parameter settings for a plurality of encoder-decoder pairs that enhance video compression performance of the concatenated chain 104 as a whole.

Therefore, to optimize the number of factors to be analyzed, the processing subsystem 124, in one embodiment, may employ techniques such as a genetic algorithm, a simulated annealing technique, a hill climbing method, a fuzzy logic, or combinations thereof. These techniques enable the processing subsystem 124 to identify one or more factors and their optimal operating values. Particularly, the processing subsystem 124 may employ these techniques for identifying one or more parameter settings, and one or more compression devices that substantially affect the quality and compression rate of output video. Thus, implementation of these techniques effectively reduces the search space for optimal parameter settings, thereby reducing computational resource requirements.

As noted previously with reference to FIG. 1, the processing subsystem 124 analyzes the quality of the output video measured at one or more points along the concatenated chain 104, one or more parameter settings corresponding to at least a subset of the encoder-decoder pairs, and content of the input data 102. In one embodiment, the processing subsystem 124 receives values corresponding to these factors directly from one or more devices (not shown in FIG. 2) such as image processors, quality estimating probes, and data paths coupled to the processing subsystem 124. In another embodiment, determined values for these factors may be accessed from the data repository 128 that is operatively coupled to the processing subsystem 124. In some embodiments, the data repository 128 may include memory, such as but not limited to, volatile random access memory (RAM), non-volatile read-only memory (ROM) and flash memory. The data repository 128 may further include one or more data structures such as a look-up table 204 and program data 206. The look-up table 204 may include, for example, one or more tables storing correlation matrices including the quality metrics determined at the one or more points along the concatenated chain 104, optimal values of the parameters corresponding to each encoder-decoder pair and so on. Additionally, the look-up table 204 may also store the desired characteristics of one or more previously processed image sequences. Program data 206 may include original and reference image sequences utilized for quality estimation and training and other programming code for regular functioning of the processing subsystem 124.

Further, in certain embodiments, the processing subsystem 124 may be configured to weigh the quality of output data determined at the one or more points along the concatenated chain 104 differently. The processing subsystem 124, for example, may assign a relatively lower weight to the quality of output data positioned further down the concatenated chain 104 while determining optimal values of the parameters corresponding to a encoder-decoder pair positioned upstream in the concatenated chain 104. In some embodiments, the processing subsystem 124 may further analyze the effect of the motion complexity of an input image sequence, and the specific arrangement of the encoder-decoder pairs in the concatenated chain 104 while iteratively evaluating optimal values of the different parameters. The disclosed implementation of the processing subsystem 124 including iterative analysis, thus, enables a data compression system to undergo a continuous learning process for enhancing data compression.

Particularly, the processing subsystem 124 may be configured to learn to optimize determination of optimal parameter settings corresponding to each of the encoder-decoder pairs in an offline mode, a real-time mode, or a combination thereof. Real-time learning is accomplished during over the air transmission of digital content, thereby providing faster optimization of the encoder-decoder pairs. However, such 'on the fly' learning is fairly resource and computationally intensive. In contrast, offline learning provides for slower optimization cycles, but considers a greater number of factors resulting in more fine-tuned optimization. In certain embodiments, the processing subsystem 124 may be configured to undergo a combination of offline and real-time learning based on one or more characteristics of the input image sequence. For example, the processing subsystem 124 may choose to learn in the offline mode when the motion complexity of the input data 102 is high. Higher motion complexity results in a large variation in characteristics across different segments of the input data 102. The processing subsystem 124 therefore, may choose to learn in the offline mode by analyzing one or more segments of input data 102 individually. Particularly, for each image sequence, the processing subsystem 124 may be configured to analyze previously determined quality metrics corresponding to a substantially similar image sequence to determine the effect of change in values of one or more parameters on output video quality. To that end, the processing subsystem 124 may be configured to undergo iterative learning by modifying one or more parameters in successive learning cycles.

In one embodiment, the processing subsystem 124 may be coupled to timing circuitry 208 configured for setting-up and initializing a training period for each learning cycle. Based on the resulting quality metrics received from the quality estimators 120 and 122 (see FIG. 1) or the data repository 128, the processing subsystem 124 repeats the training cycle with further modifications until either or both of at least a desired quality and a desired compression rate are achieved. Once the processing subsystem 124 undergoes a desired number of training cycles, or achieves the desired output data quality and bit rate, the parameter settings employed in the final iteration are determined to be representative of optimal values of the parameters corresponding to a particular encoder-decoder pair. Further, the processing subsystem 124 may communicate the optimal values and related information to the controller 132. The related information may include, for example, a determined subset of the encoder-decoder pairs to be optimized and a time interval between two successive updates. Subsequently, the controller 132 may update at least the subset of the compressive devices with the corresponding optimal parameter settings. Particularly, the controller 132 may update the parameter settings at determined time intervals such as every few minutes or hours, or substantially in real-time. The determined time interval and frequency of update may be determined based on the characteristics of the input data 102 such that no noticeable artifacts appear due to repeated updates.

Figure 3:
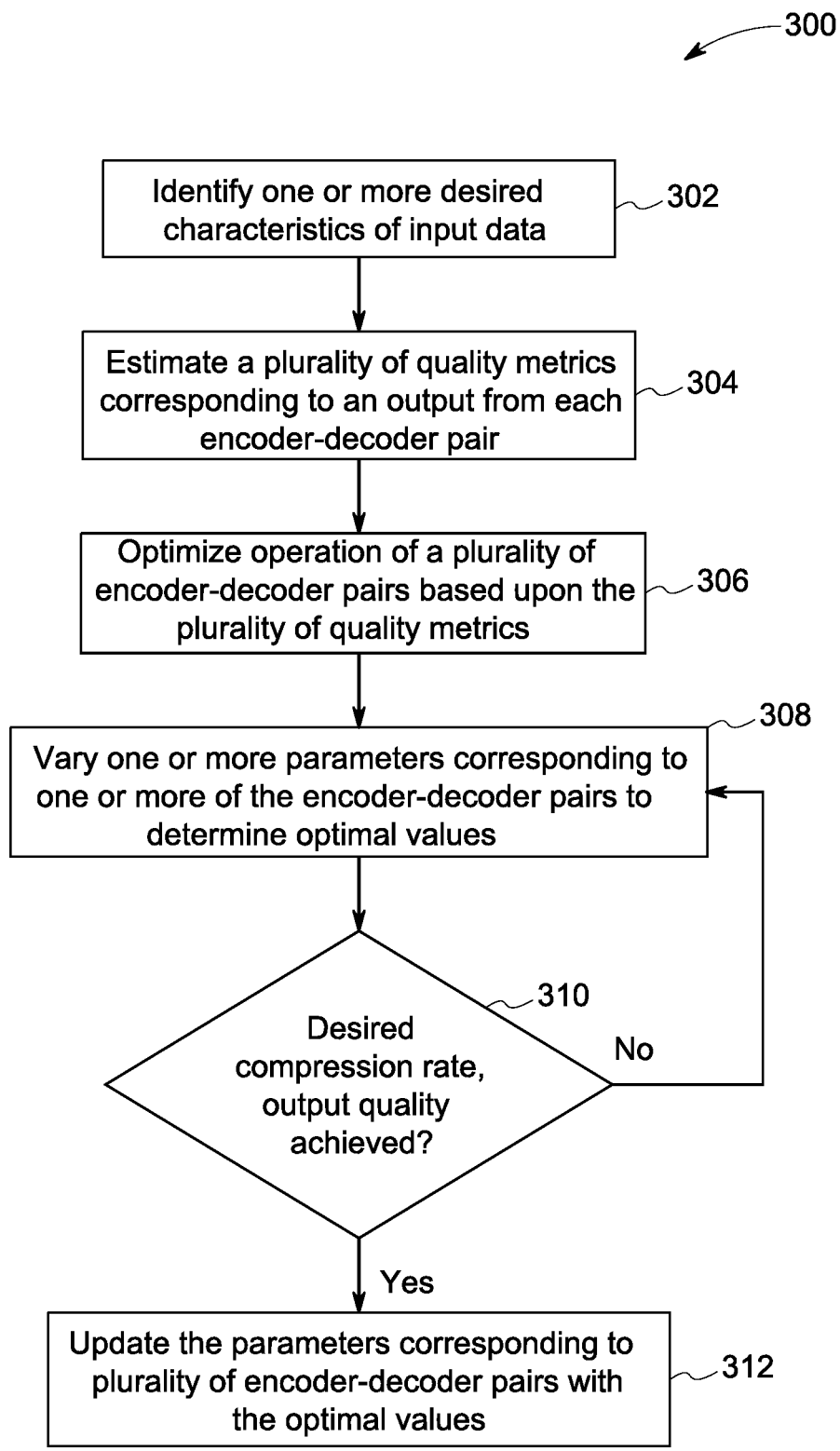
FIG. 3 is a flow chart illustrating an exemplary method for improving video compression in a concatenated chain, in accordance with aspects of the present technique.

Turning to FIG. 3, a flowchart 300 depicting an exemplary method for learning to optimize compression parameters for encoder-decoder pairs coupled in a concatenated chain, such as the concatenated chain 104 of FIG. 1, is illustrated. The method may be described in a general context of computer executable instructions. Generally, computer executable instructions may include routines, programs, objects, components, data structures, procedures, modules, functions, and the like that perform particular functions or implement particular abstract data types. The method may also be practiced in a distributed computing environment where optimization functions are performed by remote processing devices that are linked through a communication network. In a distributed computing environment, the computer executable instructions may be located in both local and remote computer storage media, including memory storage devices.

Further, in FIG. 3, the method is illustrated as a collection of blocks in a logical flow graph, which represents a sequence of operations that may be implemented in hardware, software, or combinations thereof. The various operations are depicted in the blocks to illustrate the functions that are performed generally during the pre-encoding, quality estimation, and optimization phases of a video compression application, in accordance with aspects of the present technique. In the context of software, the blocks represent computer instructions that, when executed by one or more processing subsystems, perform the recited operations. The order in which the method 300 is described is not intended to be construed as a limitation, and any number of the described blocks may be combined in any order to implement the method disclosed herein, or an equivalent alternative method. Additionally, individual blocks may be deleted from the method 300 without departing from the spirit and scope of the subject matter described herein. For discussion purposes, the method 300 is described with reference to the implementations of FIGS. 1-2.

The method 300 aims to reduce bit rates required for representing digital video images, thereby allowing more channels to be accommodated corresponding to a smaller bandwidth while producing a video of acceptable quality on delivery. The method begins at step 302 wherein one or more desired characteristics associated with the input data 102 (see FIG. 1) are identified. In the present embodiment, input data 102 may include image data, audio data, or an input video sequence. In one embodiment, the method may employ the pre-encoding element 106 (see FIG. 1) for determining nature and characteristics of the input data 102. As previously noted, the desired characteristics may include localized interest points, an object size, a location, a velocity vector, a motion complexity, or combinations thereof, that provide an estimation of a motion complexity of the input video sequence. The pre-encoding element 106 may detect one or more desired characteristics by analyzing the image sequence at source, in the compressed state, or after decoding. Typically, the image sequence analysis may be performed in a transform domain for efficient extraction of edges to enable better classification of moving or stationary elements. Alternatively, the image sequence analysis may occur in an image domain, thereby allowing faster extraction of one or more desired characteristics of interest from the input data 102. Further, the extracted characteristics may be communicated to the processing subsystem 124 (see FIG. 1) through one or more data paths coupling the processing subsystem 124 to various encoder-decoder pairs in the concatenated chain 104 (see FIG. 1).

Subsequently, at step 304, one or more quality estimators, such as the quality estimators 120 and 122 of FIG. 1, coupled to the concatenated chain 104 estimate quality metrics of the input data 102 at one or more points along the concatenated chain 104. In some embodiments, the quality estimators may be coupled either to the data repository 128 or directly to the processing subsystem 124 for communicating the determined quality metrics at the one or more points. In certain embodiments, the processing subsystem 124 may be configured to perform the functions of a quality estimator for ascertaining quality metrics corresponding to an encoder-decoder pair. Typical quality metrics include, but are not necessarily limited to a just noticeable difference (JND), a peak signal-to-noise ratio (PSNR), a structural similarity (SSIM), an image quality, an audio quality, a compression rate, or combinations thereof.

Further, at step 306, the processing subsystem 124 optimizes the operation of the plurality of encoder-decoder pairs based on the determined quality metrics. Particularly, the processing subsystem 124 may analyze a change in quality of the output data 130 owing to a corresponding change in one or more parameters based on previously determined data for the same or a substantially similar image sequence. The processing subsystem 124 may receive these previously determined values through one or more data paths or from the data repository 128. A non-exhaustive and exemplary list of parameters for which the processing subsystem 124 may receive the previously determined values includes: a local clock, a video clock, a sample depth, a macroblock size, a chroma format, a choice of spatial (intra) and temporal (inter) coding modes, a CABAC vs. Context-adaptive variable-length (CAVL) entropy coding, a state of noise reduction (off, adaptive 1-4, fixed 1-3), a state of adaptive group of pictures (GOP-on, off), a bandwidth specification (soft, medium, sharp, auto), a GOP length (12-250 frames), a GOP structure, which is the ordering of the types of frames (for example, I, P, and B, or IP, IBP, IBBP, IBBBP), a frame interval (seconds), an original state (on/off), a profile (main vs. high), a target quality (30%-100%), a variable bit rate (VBR) mode (off/on), a half-line processing (on/off), a de-speckle filter (on/off), a scene cut detection (on/off), an motion compensated temporal filtering (MCTF—on/off), and a hierarchical B (on/off). Based on the analysis, the processing subsystem 124 may identify the parameters that need to be optimized.

Additionally, the processing subsystem 124 may be further configured to consider application mandated or user mandated requirements such as a determined data rate, a determined compression ratio, a peak-signal-to-noise-ratio (PSNR), or combinations thereof, while determining optimal values for the identified parameter settings. In different embodiments, the processing subsystem 124 may employ simulated annealing or hill climbing techniques to identify the parameters of relevance corresponding to at least the subset of the encoder-decoder pairs. These techniques limit the search space for optimal encoder and decoder parameter settings that minimize distortion and bandwidth requirements, thus substantially reducing the processing time and effort.

Referring now to step 308, a process of learning to optimize the operation of each encoder-decoder pair by iteratively varying one or more parameters corresponding to the encoder-decoder pair to determine optimal values is performed. As noted previously, the processing subsystem 124 may accomplish iterative learning in an offline mode, a real-time mode, or a combination thereof. To that end, in one embodiment, the processing subsystem 124 may be implemented as a neural network. The inherently parallel structure of the neural network facilitates faster computations enabling efficient implementation of the processing subsystem 124 in video conferencing, HDTV applications, videophones, and so on. The processing subsystem 124 may govern the training of the neural network by identifying one or more of the compressive devices that substantially affect the quality of the decoded output. Further, the processing subsystem 124 may evaluate a correlation between various factors for selecting appropriate variations to be applied to the values of the parameter settings during successive learning cycles.

In accordance with aspects of the present technique, the processing subsystem 124 begins a learning process by initializing a training cycle with either random values of parameters or values selected from a previous compression cycle. Further, the processing subsystem 124 iteratively varies one or more parameter values by a determined value, each time achieving a relative improvement in either or both of output video quality and compression rate. This process is repeated with one or more desired training image sequences employed to train the neural network. Further, the processing subsystem 124 may be trained for a desired training period with each image sequence or until requirements determined by an application or a user are achieved.

In certain embodiments, the design of the artificial neural network may be a physiological analog of a human visual cortex, which includes six functionally distinct layers. An artificial neural network may be designed to provide better image observation and recognition if the architecture of the neural network is crafted to perform operations in an analog similitude with the physiology of the human visual cortex. A physiological analog artificial neural network may be instantiated with layer-centric crafting of training vectors and the layers may be trained independently. An example of such a neural network structure employing training vectors is the Neocognitron.

Subsequent to varying the parameter values, at step 310, it is verified if either or both of a desired compression rate and a desired output quality are achieved in a current training cycle. To that end, the processing subsystem 124 evaluates a difference between a desired compression rate and quality metrics and the compression rate and quality metrics achieved in the current training cycle by the encoder-decoder pair. At step 310, if it is determined that either or both of the desired quality and compression rate have not been achieved in the current iteration, control is returned to step 308 for further learning. However, at step 310, if it is verified that either or both the desired compression rate and quality have been achieved in the current training cycle, the learning process may conclude. Further, the parameter values employed in the final iteration are determined to be representative of optimal values of parameters corresponding to the encoder-decoder pair.

Subsequently, at step 312, the controller 132 updates the parameters corresponding to the encoder-decoder pairs with the corresponding optimal values. In some embodiments, the controller 132 is configured to update the parameters corresponding to only a subset of encoder-decoder pairs that substantially affect the compression performance with the corresponding optimal values. The update occurs either at determined time intervals or substantially in real-time. Further, the frequency of the updates may be determined based on user requirements or one or more determined characteristics of the input data 102. As noted previously, the frequency of updates, for example, is lower if the motion complexity for the input data 102 is low and includes elements that are substantially consistent across frames to avoid introduction of noticeable artifacts.

The system and method disclosed hereinabove, thus, enables optimization of compression performance along the entire concatenated chain 104 rather than in a single compressive device. Particularly, implementation of the processing subsystem 124 as a neural network facilitates faster computation, dynamic learning and better control of compression processes. Additionally, the method allows automatic update of parameter settings through the controller 132, thereby reducing the efforts required for operator setup and control for accommodating different types of image sequences. Moreover, the adaptive nature of the disclosed method and system optimizes performance for different arrangements of compressive devices in the concatenated chain 104 to ensure that the output video adheres to user specified or application specific quality and bandwidth requirements. Further, the disclosed embodiments include a plurality of encoder-decoder pairs coupled in series in the concatenated chain 104. However, an implementation for optimizing compression performance in the encoder-decoder pairs coupled in parallel is also contemplated.

Although the exemplary embodiments in the present technique are described in the context of a video processing system including a concatenated chain of compressive devices, use of the disclosed technique for compressing other kinds of data such as audio data, image data and mixed mode data is also contemplated. In audio compression systems, for example, the method may employ a sampling rate or a noise ratio of the audio sequence to determine the complexity of the sound. Additionally, the method may learn to optimize compression parameters by comparing original and decoded audio quality at one or more points along a concatenated chain of compressive devices.

Furthermore, the foregoing examples, demonstrations, and process steps such as those that may be performed by the processing subsystem 124 may be implemented by suitable code on a processor-based system, such as a general-purpose or special-purpose computer. It should also be noted that different implementations of the present technique may perform some or all of the steps described herein in different orders or substantially concurrently, that is, in parallel. Furthermore, the functions may be implemented in a variety of programming languages, including but not limited to C++ or Java. Such code may be stored or adapted for storage on one or more tangible, machine readable media, such as on data repository chips, local or remote hard disks, optical disks (that is, CDs or DVDs), or other media, which may be accessed by a processor-based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer data repository.

While only certain features of the present invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A data compression system, comprising:
   a plurality of encoder-decoder pairs communicatively coupled in a concatenated chain and configured to receive input data and transform the input data into compressed output data, wherein the plurality of encoder-decoder pairs each comprise:
   a first encoder-decoder pair comprising:
   a first encoder configured to compress and to encode the input data; and
   a first decoder configured to decode the data encoded and compressed by the first encoder and to provide decoded data to a subsequent encoder-decoder pair; and
   at least one additional encoder-decoder pair comprising:
      an additional encoder configured to receive decoded data from a prior encoder-decoder pair and to compress and encode the decoded data; and
      an additional decoder configured to decode the data encoded by the additional encoder and to provide the data decoded by the additional decoder to a subsequent encoder-decoder pair or provide the data decoded by the additional decoder as output data of the concatenated chain when there are no subsequent encoder-decoder pairs in the concatenated chain;
   at least one quality estimator communicatively coupled to the concatenated chain to determine one or more quality metrics corresponding to the decoded data provided by the first decoder, the decoded data provided by the additional decoder of the at least one addition encoder-decoder pairs, or a combination thereof; and
   a processing subsystem configured to optimize operation of each of the plurality of encoder-decoder pairs based upon the plurality of quality metrics, to achieve a desired level of optimization for the concatenated chain.

2. The data compression system of claim 1, further comprising a plurality of quality estimators, wherein each of the plurality of quality estimators is communicatively coupled to a corresponding encoder-decoder pair.

3. The data compression system of claim 2, wherein each of the plurality of quality estimators generates a quality metric for a corresponding encoder-decoder pair.

4. The data compression system of claim 1, wherein the processing subsystem optimizes each of the plurality of encoder-decoder pairs based on a corresponding quality metric.

5. The data compression system of claim 1, wherein the plurality of quality metrics comprise a just noticeable difference, a peak signal-to-noise ratio, a structural similarity, a compression rate, an image quality, an audio quality, or combinations thereof.

6. The data compression system of claim 1, wherein the processing subsystem optimizes each of the plurality of encoder-decoder pairs based on content of the input data.

7. The data compression system of claim 6, wherein the processing subsystem optimizes each of the plurality of encoder-decoder pairs based upon an object size, a location, a velocity vector, a complexity of motion, or combinations thereof.

8. The data compression system of claim 1, wherein the input data comprises image data, audio data or a combination of image data and audio data.

9. The data compression system of claim 8, wherein the processing subsystem analyzes the image data, the audio data or the combination of the image data and the audio data in an image domain, a transform domain, or a combination thereof.

10. The data compression system of claim of claim 1, wherein the processing subsystem is configured to employ a genetic algorithm, a simulated annealing technique, a hill climbing method, fuzzy logic, and combinations thereof, to optimize operation of each of the plurality of encoder-decoder pairs.

11. The data compression system of claim 1, wherein the processing subsystem is configured to iteratively vary one or more parameters corresponding to the plurality of encoder-decoder pairs to determine optimal values that achieve a desired quality or compression rate or combined quality and compression rate of the output data.

12. The data compression system of claim 11, further comprising a controller that updates the one or more parameters corresponding to the plurality of encoder-decoder pairs with the determined optimal values.

13. The data compression system of claim 12, wherein the controller updates the one or more parameters corresponding to the plurality of encoder-decoder pairs with the optimal values at determined time intervals, or substantially in real-time.

14. The data compression system of claim 11, further comprising a data repository for storing at least one of the input data, the plurality of quality metrics corresponding to an output from each of the plurality of encoder-decoder pairs, and the optimal values corresponding to the one or more parameters corresponding to the plurality of encoder-decoder pairs.

15. The data compression system of claim 1, wherein the processing subsystem comprises at least one of a linear classifier, a perceptron, a decision tree, a neural network, a support vector machine, perpetual quartz systems, and a field programmable gate array, to optimize operation of each of the plurality of encoder-decoder pairs for achieving a desired level of optimization for the concatenated chain.

16. The data compression system of claim 15, wherein the neural network is a physiological analog of the human visual cortex.

17. The data compression system of claim 1, wherein the at least one quality estimator determines the quality metrics based on a comparison of a quality metric associated with output from an encoder-decoder pair and a corresponding quality metric associated with a reference data, or based on an estimation function for determining quality metrics corresponding to the output from the encoder-decoder pair.

18. A method for improving data compression, comprising:
identifying one or more desired characteristics of input data provided to a plurality of encoder-decoder pairs communicatively coupled in a concatenated chain, the plurality of encoder-decoder pairs configured to receive the input data and transform the input data into compressed output data by:
using a first encoder-decoder pair to:
compress and encode the input data, creating compressed and encoded input data, decode the compressed and encoded input data, creating decoded input data, and provide the decoded input data to a subsequent encoder-decoder pair; and
using at least one additional encoder-decoder pair to:
receive a decoded output from a previous encoder-decoder pair,
compress and encode the decoded output from the previous encoder-decoder pair, creating subsequent compressed and encoded data,
decode the subsequent compressed and encoded data, creating subsequent decoded data; and
provide the subsequent decoded data to a subsequent additional encoder-decoder pair of the concatenated chain or provide the subsequent decoded data as output data of the concatenated chain when there are no subsequent encoder-decoder pairs in the concatenated chain;
estimating one or more quality metrics corresponding to an output from each of the plurality of encoder-decoder pairs; and
optimizing operation of each of the plurality of encoder-decoder pairs based upon the plurality of quality metrics, to achieve a desired level of optimization for the concatenated chain.

19. The method of claim 18, wherein optimizing operation of each of the plurality of encoder-decoder pairs comprises iteratively varying one or more parameters corresponding to one or more of the encoder-decoder pairs to determine optimal values that achieve a desired output quality or compression rate or combined output quality and compression rate of the output data.

20. The method of claim 19, wherein optimizing operation of each of the plurality of encoder-decoder pairs comprises updating one or more parameters corresponding to the plurality of encoder-decoder pairs with the optimal values at determined time intervals, or substantially in real-time.

* * * * *